United States Patent [19]

Yamada et al.

[11] Patent Number: 4,670,207

[45] Date of Patent: Jun. 2, 1987

[54] METHOD OF BONDING PLASTIC PIPES

[75] Inventors: Yonekazu Yamada, Sakado; Osamu Sato, Fujimi; Takemi Tanaka, Asaka, all of Japan

[73] Assignee: Sekisui Kagaku Kogyo Kabushiki Kaisha, Osaka, Japan

[21] Appl. No.: 812,934

[22] Filed: Dec. 23, 1985

[30] Foreign Application Priority Data

Dec. 26, 1984 [JP] Japan .................. 59-280550

[51] Int. Cl.$^4$ ........................................... B29C 65/18
[52] U.S. Cl. .................................. 264/248; 156/294; 156/322
[58] Field of Search .............. 264/248; 156/294, 309.9, 156/322, 324.4

[56] References Cited

FOREIGN PATENT DOCUMENTS

| | | | |
|---|---|---|---|
| 53-147776 | 12/1978 | Japan | 156/294 |
| 57-64513 | 4/1982 | Japan | 156/294 |
| 349068 | 11/1960 | Switzerland | 156/294 |

*Primary Examiner*—Jan H. Silbaugh
*Assistant Examiner*—L. Tentoni
*Attorney, Agent, or Firm*—Wenderoth, Lind & Ponack

[57] ABSTRACT

A method of bonding plastic pipes, which comprises heat-melting the outer circumferential surface of an end portion of a plastic pipe and the inner circumferential surface of a sockt portion of a plastic joint, and inserting the end portion of the plastic pipe into the socket portion of the plastic joint to thereby bond the two; wherein the inner circumferential surface of the socket portion of the plastic joint is tapered so that the socket portion becomes progressively smaller in diameter in a direction away from its end portion, or the outer circumferential surface of the end portion of the plastic pipe is tapered so that the end portion becomes progressively smaller in diameter toward its insertion end, and wherein when the end portion of the plastic pipe is to be heated, the length from its insertion end of a part to be heated is made nearly equal to the final insertion length of the pipe and when the socket portion of the plastic joint is to be heated, the length from the socket end of a part to be heated is made shorter than the final insertion length of the pipe by a predetermined distance.

8 Claims, 5 Drawing Figures

METHOD OF BONDING PLASTIC PIPES

This invention relates to a method of bonding plastic pipes by inserting a plastic pipe into a plastic joint and melt-bonding them together, which is a so-called socket bonding method.

It is known that the production of super LSIs requires water having a very high purity, namely ultrapure water. Nowadays, super LSIs having a higher degree of integration are being developed, and ultrapure water having a higher purity is required.

A plastic pipe, particularly a vinyl chloride resin pipe, is used as a flow passage of ultrapure water, and such pipes are connected through a joint of the same material. In the prior art, the outer circumferential surface of the surface and the inner circumferential pipe of the joint are bonded by means of an adhesive. According to this bonding method, tiny amounts of organic materials constituting the adhesive dissolve in ultrapure water to reduce its purity, and it is anticipated that this method will become unacceptable in the future.

As a substitute, there is a method of bonding a pipe and a joint of a vinyl chloride resin without using an adhesive. The socket bonding method is practiced generally with regard to pipes of olefinic resins, but has not yet been put to practice in bonding vinyl chloride resin pipes.

The prior socket bonding method for olefinic resin pipes is carried out as shown in FIG. 5. Specifically, the outside diameter of an end portion 111 of a pipe 110 is made slightly larger than the inside diameter of a socket portion 121 of a joint 120. The outer circumferential surface of the pipe 110 and the inner circumferential surface of the joint 120 are melted under heat at that part which corresponds to the final insertion length L'. Thereafter, the pipe 110 is inserted into the joint 120 and the two are bonded through the molten resin X' at the outer circumferential surface of the pipe 110 and the inner circumferential surface of the joint 120.

According to this method, the insertion end 111a of the pipe 110 pushes part of the molten resin on the inner circumferential surface of the joint 120 in a direction away from the socket portion 121a, and consequently, as shown in FIG. 5, a bead (a protrusion of the resin) A is formed in the vicinity of the insertion end 111a of the pipe 110 inwardly of the joint 120. Likewise, the socket end 121a of the joint 120 pushes part of the molten resin at the outer circumferential surface of the pipe 110, and consequently, a bead A is also formed in the vicinity of the socket end 121a. These beads A do not have a smooth surface, and contain fine raised and depressed portions. In particular, when the bead A exists on the inside of the flow passage, microorganisms occur in the raised and depressed areas of the bead A. Dead microorganisms will dissolve in ultrapure water to reduce its purity.

It is an object of this invention to solve the aforesaid problems of the socket bonding method.

According to this invention, there is provided a method of bonding plastic pipes, which comprises heat-melting the outer circumferential surface of an end portion of a plastic pipe and the inner circumferential surface of a socket portion of a plastic joint, and inserting the end portion of the plastic pipe into the socket portion of the plastic joint to thereby bond the two; wherein the inner circumferential surface of the socket portion of the plastic joint is tapered so that the socket portion becomes progressively smaller in diameter in a direction away from its end portion, or the outer circumferential surface of the end portion of the plastic pipe is tapered so that the end portion becomes progressively smaller in diameter toward its insertion end, and wherein when the end portion of the plastic pipe is to be heated, the length from its insertion end of a part to be heated is made nearly equal to the final insertion length of the pipe and when the socket portion of the plastic joint is to be heated, the length from the socket end of a part to be heated is made shorter than the final insertion length of the pipe by a predetermined distance.

By tapering the inner circumferential surface of the socket portion of the joint or the outer circumferential surface of the end portion of the pipe, the bonding pressure at the time of inserting the pipe into the joint and bonding them can be increased, and therefore, a high bond strength can be obtained. However, if the bonding pressure is high, the formation of a bead tends to be facilitated. It has now been found that such bead formation can be prevented by making the length of a portion to be heated extending from the socket end of the joint shorter by a predetermined distance than the final insertion length of the pipe.

When the inclination 1/T of the taper on the inner circumferential surface of the joint or the outer circumferential surface of the pipe is expressed as the amount of the decrease of the diameter of the tapered portion relative to its axial length, it is preferably selected within the following range.

$$1/T = 1/30 \sim 1/45$$

If the inclination is too low, the molten resin is not sufficiently filled in the space between the pipe and the joint, and therefore, the effect of increasing the bond strength cannot be achieved. If, on the other hand, the inclination is too high, bead formation tends to increase. From the standpoint of productivity in actual practice, it is advantageous to provide a taper on the inner circumferential surface of the joint rather than to form it on the outer circumferential surface of the pipe.

Generally, the inside diameter D of the socket end of the joint is made larger than the outside diameter $D_o$ of the pipe by 0.5 to 2.3%. If the increase is less than 0.5%, a bead tends to form during bonding. If it exceeds 2.3%, the bonding pressure of the bonding surfaces of the pipe and the joint decreases, and the bond strength becomes insufficient.

The final insertion length $L_0$ is generally adjusted to 0.8 to 1.5 times the outside diameter $D_o$ of the pipe. If it is shorter than 0.8 times, the area of bonding between the pipe and the joint is small and the bond strength becomes insufficient. If it is more than 1.5 times, it is difficult to insert the pipe to the desired position. Consequently, the molten resin cannot be fully filled in the space between the pipe and the joint, and the bond strength becomes insufficient.

The suitable difference d between the final insertion length $L_o$ of the pipe into the joint and the length $L_1$ of the part to be heated extending from the socket end of the joint varies depending upon the type of the resin used. Generally, it is in the range of 0.5 to 10 mm. When the pipe and the joint to be bonded are made of a relatively high-melting resin such as chlorinated polyvinyl chloride, the d value is preferably relatively low within the above range. If, on the other hand, the pipe and the joint are made of a relatively low-melting resin such as polyvinylidene fluoride, the value d is preferably relatively high within the above range. When the pipe and the joint are made of an ordinary vinyl chloride resin, the value d is preferably about 4 to 6 mm, especially about 5 mm.

A flow passage constructed by bonding pipes by the method of this invention is free from entry of organic materials because no adhesive is used in bonding. Moreover, since a bead is not formed in the pipe joint, the occurrence of microorganisms can be prevented, and a fluid flowing through this passage can be maintained at a high purity.

The method of this invention will now be described in greater detail with reference to the embodiments shown in the acompanying drawings, in which FIG. 1 is a sectional view showing the state of heating a plastic joint;

Figure 3:
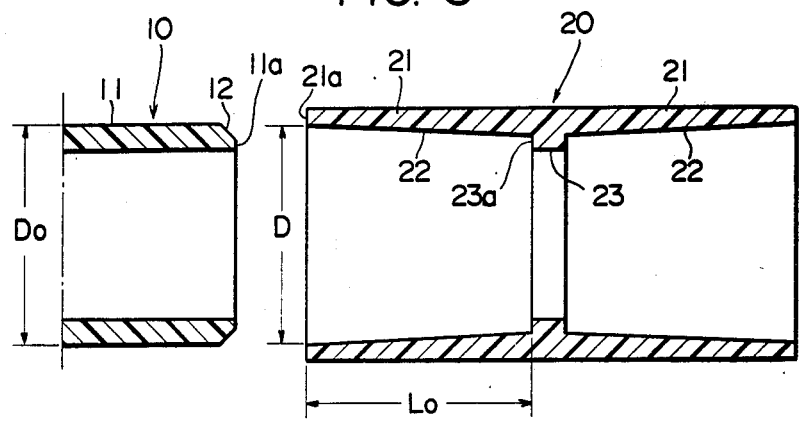
FIG. 3 is a sectional view showing the plastic pipe and the plastic joint as they are before bonding.

FIG. 3 shows an end portion 11 of a plastic pipe 10 and a plastic two-way joint 20 as they are before bonding. The pipe 10 has an outside diameter $D_o$ and the outer circumferential surface of its end 11a is chamfered at an angle of about 45 degrees as shown at 12. The pipe and the joint are both made of an ordinary vinyl chloride resin.

The joint 20 has a socket portion 21 at both side portions, and a taper 22 progressively becoming smaller in diameter in a direction away from the socket end is formed on the inner circumferential surface of the socket portion 21. Preferably, the inside diameter D of the socket end 21a of the joint 20 is made larger than the outside diameter $D_o$ of the pipe 10 by 0.5 to 2.3% as stated above. In the embodiment shown in FIG. 3, it is about 1.3% larger. The inclination 1/T of the taper 22 is preferably 1/30 to 1/45 as stated hereinabove. In the embodiment shown in the drawings, 1/T is 1/37.

The joint 20 has an annular protrusion 23 on the inner circumferential surface of its central portion, and the length $L_o$ from the socket end 21a to the end surface 23a of the protrusion 23 becomes the final insertion length of the pipe to be described hereinbelow. The final insertion length $L_o$ is preferably 0.8 to 1.5 times the diameter $D_o$ of the pipe 10, as stated hereinabove. In the embodiment shown in the drawings, $L_o$ is nearly equal to $D_o$.

Figure 1:
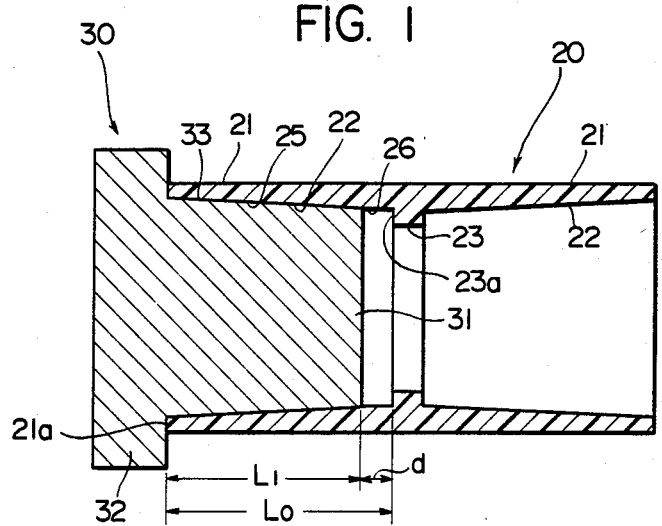
Figure 2:
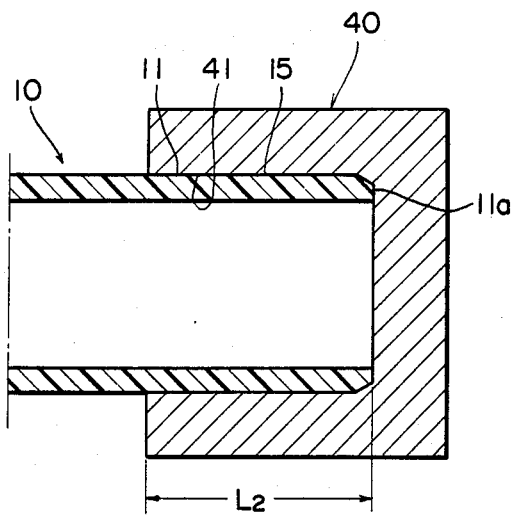
FIG. 2 is a sectional view showing the state of heating a plastic pipe.

In carrying out the method of this invention, the outer circumferential surface of the end portion 11 of the pipe 10 and the inner circumferential surface of the socket portion 21 of the joint 20 are first melted by heating. Melting is preferably carried out by using heating molds 30 and 40 shown in FIGS. 1 and 2.

The heating mold 30 for the joint 20 is made of aluminum and coated with Teflon on its surface. It has a cylindrical inserting portion 31 and a collar portion 32 provided at one side end of the inserting portion 31. The outer circumferential surface of the inserting portion 31 has a taper 33 conforming to the taper 22 on the socket portion 21 of the joint 20. The inserting portion 31 of the heating mold 30 is inserted into the socket portion 21 of the joint 20 and positioned in place by abutting the socket end 21a against the collar portion 32. At this position, the forward end of the inserting portion 31 does not reach the protrusion 23 of the joint 20, and the insertion length $L_1$ from the socket end 21a is shorter than the aforesaid final insertion length $L_o$ by a predetermined distance d. Hence, a portion 25 to be heated of the joint 20 has a length corresponding to the length $L_1$, and the neighborhood of the protrusion 23 constitutes a non-melted portion 26 having a length d. The length d of the nonmelted portion 26 is selected within the range of 0.5 to 10 mm as stated above. In the present embodiment, d is about 5 mm when the joint is made of a vinyl chloride resin.

The heating mold 40 for the pipe 10 is made of aluminum and coated with TEFLON (polyfluoroethylene) at its surface. It has a recessed portion 41 conforming to the outer configuration of the end portion 11 of the pipe 10, and the length $L_2$ of the recessed portion 41 is equal to the aforesaid final insertion length $L_o$. The pipe 10 is inserted into the recessed portion 41, and positioned in place by abutting the forward end 11a of the pipe 10 against the farthest surface of the recessed portion 41. Consequently, the length $L_2$ of a portion 15 to be heated of the pipe 10 from the end 11a becomes equal to the final insertion length $L_o$.

The pipe 10 and the joint 20 are heated by raising the surface temperatures of the heating molds 30 and 40 to a predetermined point. When the pipe and the joint are made of a vinyl chloride resin, the heating temperature is adjusted to 240° to 270° C. The difference between the heating temperatures of the pipe 10 and the joint 20 is adjusted to not more than about 5° C. It is sufficient that the heating time is 15 to 30 seconds.

Figure 4:
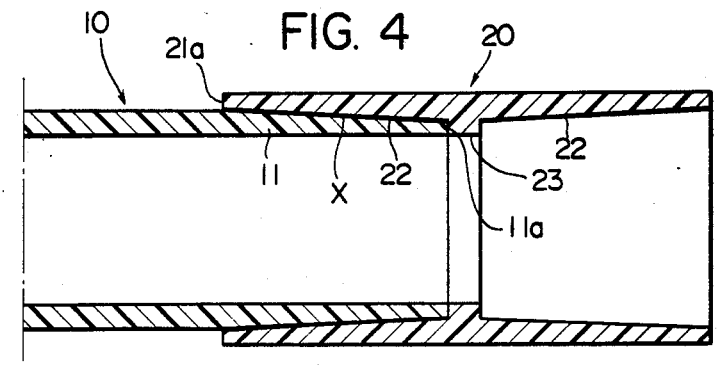
FIG. 4 is a sectional view showing the state of the pipe and the joint after bonding.
Figure 5:
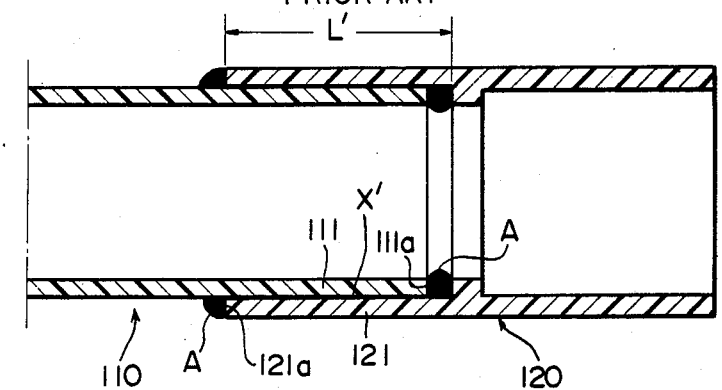
FIG. 5 is a sectional view showing the state of bonding of a plastic pipe and a plastic joint by a conventional method.

After the pipe and the joint are heated as above, the end portion 11 of the pipe 10 is inserted into the socket portion 21 of the joint 20 to a point at which its end 11a abuts against the protrusion 23, as shown in FIG. 4. Since at this time, the inner circumferential surface of the socket portion 21 and the outer circumferential surface of the end portion 11 are in the molten state, the pipe 10 and the joint 20 can be melt-bonded through the molten resin X.

During the insertion of the pipe 10 into the socket portion 21 of the joint, the pipe 10 advances while its inserting end 11a pushes part of the molten resin in the inner circumferential surface of the joint 20 toward the interior part of the joint 20. When the pipe reaches the non-melted part 26 of the joint 20 in the final stage of insertion, the end 11a of the pipe 10 no longer pushes the molten resin since the surface of the non-melted part 26 is not molten. Accordingly, when the pipe 10 passes along the non-melted part 26, some amount of the molten resin which has previously been pushed by the end 11a of the pipe 10 and gathered at the end 11a and the molten resin in that part of the inner circumferential surface of the joint 20 which is near the end 11a of the pipe 10 are supplied between the nearby part of the end 11a and the non-melted part 26. Consequently, when the end 11a reaches the end surface 23a of the annular protrusion 23, the formation of a bead is prevented.

Another advantageous feature of the invention is that the end 11a of the pipe 10 is chamfered as shown at 12. Because of this structure, a part of the molten resin pushed by the end 11a is accumulated in the recessed portion formed between the chamfered part 12 and the inner circumferential surface of the joint 20, and the amount of the molten resin pushed forwardly by the end 11a of the pipe 10 decreases. Thus, the chamfer 12 also serves to prevent bead formation.

In addition, because of the aforesaid sizes and shapes of the pipe 10 and the joint 20, the molten resin can be filled in proper amounts between the pipe 10 and the joint 20. As a result, bead formation in the inside and outside of the joint can be accurately prevented, and a sufficient bond strength can be obtained.

A similar pipe 10 is bonded to the other socket portion 21 (the right side in the drawings) of the joint 20 in the same way as described above.

A flow passage constructed by connecting a number of pipes 10 by the method described above is free from bead formation in the inside of the joint 20. Hence, the occurrence of microorganisms can be prevented, and no organic materials get mixed with a fluid passing through the passage, This is very useful for supplying ultrapure water.

While the invention has been described with reference to the specific embodiments shown in the drawings, it should be understood that the invention is not limited to these specific embodiments, and various modifications and changes are possible within the spirit and scope of the invention described and claimed herein.

What is claimed is:

1. A method of bonding plastic pipes, which comprises heat-melting the outer circumferential surface of an end portion of a vinyl chloride resin pipe and the inner circumferential surface of a socket portion of a vinyl chloride resin joint, and inserting the end portion of the pipe into the socket portion of the joint to thereby bond the two while preventing formation of beads thereon wherein the inner circumferential surface of the socket portion of the joint is tapered so that the socket portion becomes progressively smaller in diameter in a direction away from its end portion, or the outer circumferential surface of the end portion of the pipe is tapered so that the end portion becomes progressively smaller in diameter toward its insertion end, and wherein when the end portion of the pipe is to be heated, the length from its insertion end of a part to be heated is made nearly equal to the final insertion length of the pipe and when the socket portion of the joint is to be heated, the length from the socket end of a part to be heated is made shorter than the final insertion length of the pipe by a predetermined distance and wherein the pipe is bonded at its outer surface to the socket portion along the active final insertion length of the pipe.

2. The method of claim 1 wherein the length of the part to be heated of the joint extending from its socket end is shorter than the final insertion length of the pipe by 0.5 to 10 mm.

3. The method of claim 2 wherein the length of the part to be heated of the joint extending from its socket end is shorter than the final insertion length of the pipe by 4 to 6 mm.

4. The method of claim 3 wherein the length of the part to be heated of the joint extending from its socket end is shorter than the final insertion length of the pipe by about 5 mm.

5. The method of claim 1 wherein the inside diameter of the socket end of the joint is 0.5 to 2.3% larger than the outside diameter of the pipe, the inclination of the taper at the inner circumferential surface of the socket portion of the joint, as the amount of decrease of the inside diameter relative to the axial length, is adjusted to 1/30 to 1/45, the final insertion length of the pipe is 0.8 to 1.5 times its outside diameter.

6. The method of claim 1 wherein the outer circumferential surface of the end portion of the pipe and the inner circumferential surface of the socket portion of the joint are heated at a surface temperature of 240° to 270° C. for 15 to 30 seconds.

7. The method of claim 1 wherein the outer circumferential surface of the insertion end of the pipe is chamfered.

8. The method of claim 1 wherein the outer circumferential surface of the end portion of the pipe and the inner circumferential surface of the socket portion of the pipe are heated by using heating molds.

* * * * *